United States Patent
Kim

(10) Patent No.: US 9,892,046 B2
(45) Date of Patent: Feb. 13, 2018

(54) CACHE ALLOCATION BASED ON QUALITY-OF-SERVICE INFORMATION

(71) Applicant: SAMSUNG ELECTRONICS CO., LTD., Suwon-si, Gyeonggi-Do (KR)

(72) Inventor: Moon Gyung Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 50 days.

(21) Appl. No.: 14/933,144

(22) Filed: Nov. 5, 2015

(65) Prior Publication Data
US 2016/0154734 A1 Jun. 2, 2016

(30) Foreign Application Priority Data
Nov. 28, 2014 (KR) .................. 10-2014-0168680

(51) Int. Cl.
*G06F 12/084* (2016.01)
*G06F 3/06* (2006.01)

(52) U.S. Cl.
CPC ............ *G06F 12/084* (2013.01); *G06F 3/061* (2013.01); *G06F 3/0631* (2013.01); *G06F 3/0647* (2013.01); *G06F 3/0683* (2013.01); *G06F 2212/6042* (2013.01)

(58) Field of Classification Search
CPC ...... G06F 12/084; G06F 3/061; G06F 3/0631; G06F 3/0647; G06F 3/0683
USPC ........................................................ 711/130
See application file for complete search history.

(56) References Cited

U.S. PATENT DOCUMENTS

| | | |
|---|---|---|
| 6,493,800 B1 | 12/2002 | Blumrich |
| 6,678,793 B1 | 1/2004 | Doyle |
| 6,877,067 B2 | 4/2005 | Yam Azaki |
| 7,107,403 B2 | 9/2006 | Modha et al. |
| 7,558,920 B2 | 7/2009 | Mattina et al. |
| 8,035,650 B2 | 10/2011 | Du et al. |
| 8,244,982 B2 | 8/2012 | Wolfe et al. |
| 8,490,107 B2 | 7/2013 | Jalal et al. |
| 2008/0040554 A1 | 2/2008 | Zhao et al. |
| 2011/0047333 A1* | 2/2011 | Wolfe ................... G06F 12/084 711/125 |
| 2011/0061058 A1 | 3/2011 | Nonogaki |
| 2012/0060007 A1 | 3/2012 | Baik et al. |
| 2012/0079235 A1 | 3/2012 | Iyer et al. |
| 2012/0331234 A1 | 12/2012 | Hirao et al. |
| 2013/0138891 A1* | 5/2013 | Chockler .............. G06F 9/5016 711/133 |
| 2013/0318302 A1* | 11/2013 | Kim .................... G06F 12/0891 711/122 |

(Continued)

FOREIGN PATENT DOCUMENTS

| | | |
|---|---|---|
| JP | 2009211649 | 9/2009 |
| KR | 20120054967 | 12/2013 |
| KR | 10-1356541 | 1/2014 |

*Primary Examiner* — Than Nguyen
(74) *Attorney, Agent, or Firm* — Volentine & Whitt, PLLC

(57) ABSTRACT

A cache memory device shared by a plurality of processors includes a cache memory configured to store some of data stored in a main memory and to be accessed by the plurality of processors. A cache controller stores quality-of-service (QoS) information of each of the plurality of processors and differently sets a size of a storage space of the cache memory to be managed by a target processor, based on the QoS information of the target processor.

19 Claims, 10 Drawing Sheets

(56) References Cited

U.S. PATENT DOCUMENTS

2014/0122824 A1* 5/2014 Lewsey .................. G06F 12/02
                                                         711/170
2016/0034023 A1* 2/2016 Arora .................. G06F 12/0862
                                                         711/137

* cited by examiner

FIG. 7

| PID   | 1  | 2  | 3  | 4  |
|-------|----|----|----|----|
| P_QoS | Q1 | Q2 | Q3 | Q4 |

FIG. 8A

| P_QoS | Q1 | Q2 | Q3 | Q4 |
|---|---|---|---|---|
| Number of Entries | N1 | N2 | N3 | N4 |

FIG. 8B

| P_QoS | Q1 | Q2 | Q3 | Q4 |
|---|---|---|---|---|
| Entry Group | G1<br>G2<br>G3<br>G4 | G1<br>G2<br>G3 | G1<br>G2 | G1 |

US 9,892,046 B2

CACHE ALLOCATION BASED ON QUALITY-OF-SERVICE INFORMATION

CROSS-REFERENCE TO RELATED APPLICATION

This application claims the benefit of Korean Patent Application No. 10-2014-0168680, filed on Nov. 28, 2014, in the Korean Intellectual Property Office, the disclosure of which is incorporated herein in its entirety by reference.

BACKGROUND

One or more exemplary embodiments of the disclosure relate to a cache memory device and an electronic system including the same.

In general, a cache memory is used in processors or system-on-chips (SoCs). The performance of a semiconductor integrated circuit or a system including a cache is greatly influenced by the cache memory.

In particular, in the case of a cache memory shared by two or more processors, the performance of a whole system may vary according to a method of operating the cache memory.

SUMMARY

According to an aspect of the disclosure, an electronic system includes a first processor; a second processor; a cache memory configured to store some of data stored in a main memory and to be accessible by the first and second processors; and a cache controller configured to differently set a size of a storage space of the cache memory to be managed by each of the first and second processors, based on quality-of-service (QoS) information of each of the first and second processors.

The cache controller may include a QoS information storage unit configured to store the QoS information of each of the first and second processors. The cache memory may include a plurality of entries.

The cache controller may further include a size information storage unit configured to store cache size information according to the QoS information.

The cache controller may limit entries to be managed by a target processor among the plurality of entries, based on the cache size information.

The cache memory may be an n-way set-associative cache including n ways, wherein n denotes an integer equal to or greater than '2'.

The cache controller may limit ways to be managed among the n ways, based on the cache size information.

The plurality of entries may be divided into two or more entry groups. The cache controller may limit an entry group to be accessed among the two or more entry groups, based on the cache size information.

According to another aspect of the disclosure, there is provided a cache memory device shared by a plurality of processors, e.g., two or more processors.

The cache memory includes a cache memory configured to store some of data stored in a main memory and be accessed by the plurality of processors, e.g., the two or more processors; and a cache controller configured to store quality-of-service (QoS) information of each of the plurality of processors, and differently allocate a size of a storage space of the cache memory to be managed by a target processor, based on the QoS information of the target processor.

The cache controller may include a QoS information storage unit configured to store the QoS information of each of the plurality of processors, and receive a processor identifier of one of the plurality of processors when a transaction is received from the processor and extract QoS information corresponding to the processor identifier from the QoS information storage unit.

The cache controller may further include a size information storage unit configured to store cache size information according to the QoS information. The cache memory may include a plurality of entries.

According to another aspect of the disclosure, there is provided a method, executed by a cache memory controller, of allocating memory of a cache, shared in common by multiple processors, to each of the processors. The method includes receiving, from each of the processors, an electronic communication comprising an indication of the processor's identification; identifying, for each processor based upon the indication of the processor's identification, quality-of-service (QoS) information identifying a QoS required by the processor; and allocating memory of the cache to each of the processors in accordance with the identified QoS information for the processor.

The method may further include receiving a data request from a first of the processors; determining whether the requested data is stored in the memory allocated to the first processor; determining whether the memory allocated to the first processor should be expanded, upon determining that the requested data is not stored in the memory allocated to the first processor; and allocating additional memory to the first processor, upon determining that the memory allocated to the first processor should be expanded.

The method may further include determining whether a data entry stored in the memory of the cache allocated to the first processor should be replaced with the data requested by the first processor, upon determining that the memory allocated to the first processor should not be expanded; and replacing the data entry with the data requested by the first processor, upon determining that the data entry stored in the memory of the cache allocated to the first processor should be replaced with the data requested by the first processor.

The method may further include selecting, for each of the processors, an amount of memory for allocation among a plurality of amounts corresponding to the QoS information. The memory of the cache is allocated to each of the processors in accordance with the selected amount.

According to another aspect of the disclosure, there is provided a cache memory apparatus shared in common by multiple processors. The apparatus includes a cache and a cache controller. The cache controller receives, from each of the processors, an indication of the processor's identification; identifies, for each processor based upon the indication of the processor's identification, quality-of-service (QoS) information identifying a QoS required by the processor; and allocates memory of the cache to each of the processors in accordance with the QoS information for the processor.

The cache controller may further receive a data request from a first of the processors; determine whether the requested data is stored in the memory allocated to the first processor; determine whether the memory allocated to the first processor should be expanded, upon determining that the requested data is not stored in the memory allocated to the first processor; and allocate additional memory to the first processor, upon determining that the memory allocated to the first processor should be expanded.

The cache controller may further determine whether a data entry stored in the memory of the cache allocated to the first processor should be replaced with the data requested by the first processor, upon determining that the memory allocated to the first processor should not be expanded; and replace the data entry with the data requested by the first processor, upon determining that the data entry stored in the memory of the cache allocated to the first processor should be replaced with the data requested by the first processor.

The cache controller may further select, for each of the processors, an amount of memory for allocation among a plurality of amounts corresponding to the QoS information. The memory of the cache is allocated to each of the processors in accordance with the selected amount.

BRIEF DESCRIPTION OF THE DRAWINGS

Exemplary embodiments of the disclosure will be more clearly understood from the following detailed description taken in conjunction with the accompanying drawings in which:

FIG. 7 illustrates a data structure of a quality-of-service (QoS) information storage unit of FIG. 6 according to an embodiment of the disclosure;

FIG. 8A illustrates a data structure of a size information storage unit of FIG. 6 according to an embodiment of the disclosure;

FIG. 8B illustrates a data structure of a size information storage unit of FIG. 6 according to another embodiment of the disclosure;

DETAILED DESCRIPTION OF THE EMBODIMENTS

Figure 1:
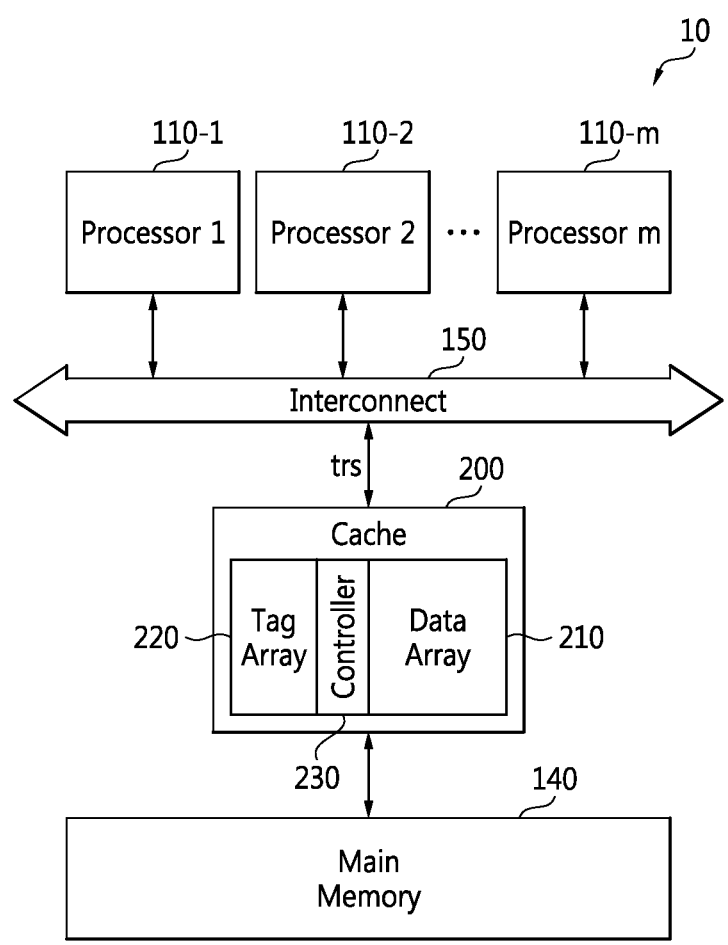
FIG. 1 is a block diagram of an electronic system according to an embodiment of the disclosure.

The disclosure now will be described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an electronic system 10 according to an embodiment of the disclosure.

Referring to FIG. 1, the electronic system 10 may be a mobile phone, a smart phone, a tablet computer, a personal digital assistant (PDA), an enterprise digital assistant (EDA), a digital still camera, a digital video camera, a portable multimedia player (PMP), a personal/portable navigation device (PDN), a handheld game console, or a handheld device such as an e-book.

The electronic system 10 may include a plurality of processors (e.g., m processors 110-1, 110-2, and 110-m), a main memory 140, a system bus 150, and a cache memory 200. Here, 'm' denotes an integer equal to or greater than '2'.

The first to $m^{th}$ processors 110-1, 110-2, and 110-m may each process or execute programs and/or data stored in the main memory 140. For example, each of the processors 110-1, 110-2, and 110-m may process or execute the programs and/or the data according to a clock signal output from a clock signal generator (not shown).

The processors 110-1, 110-2, and 110-m may be either separate processors or cores that constitute a multi-core processor. The multi-core processor is a computing component with two or more independent and substantial processors (which are referred to as 'cores'). Each of the cores may read and execute program instructions.

Each of the first to $m^{th}$ processors 110-1, 110-2, and 110-m may be, but is not limited to, a central processing unit (CPU), a graphic processing unit (GPU), a multi-format codec (MFC), a Joint Photographic Experts Group (JPEG) processor, or a video processor.

The main memory 140 may store commands and data to be executed by the first to $m^{th}$ processors 110-1, 110-2, and 110-m. The main memory 140 may be a volatile memory device or a nonvolatile memory device.

The volatile memory device may be a dynamic random access memory (DRAM), a static RAM (SRAM), a thyristor RAM (T-RAM), a zero capacitor RAM (Z-RAM), or a twin transistor RAM (TTRAM).

The nonvolatile memory device may be an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase-change RAM (PRAM), a resistive RAM (RRAM), a nanotube RRAM, a polymer RAM (PoRAM), a nano floating gate memory (nFGm), a holographic memory, a molecular electronics memory device, or an insulator resistance change memory.

The cache memory 200 (which may be also referred to as a 'system cache') may be connected between the system bus 150 and the main memory 140.

In one exemplary embodiment, the cache memory 200 may be a volatile memory device, e.g., an SRAM.

The cache memory 200 may include a data memory (data array) 210, a tag memory (tag array) 220, and a cache controller 230.

The cache controller 230 may be a finite state machine (FSM).

In one exemplary embodiment, a cache memory (e.g., an L1 cache) (not shown) may be included in the first to $m^{th}$ processors 110-1, 110-2, and 110-m.

For example, the first processor 110-1 may include an L1 cache (not shown). The L1 cache may be disposed on the same chip as the first processor 110-1.

The electronic system 10 may further include an L2 cache (not shown). The L2 cache may be installed either on a chip different from a chip on which the first to $m^{th}$ processors 110-1, 110-2, and 110-m are installed or an expansion card, and connected between one of the first to $m^{th}$ processors 110-1, 110-2, and 110-m and the system bus 150.

Figure 2:
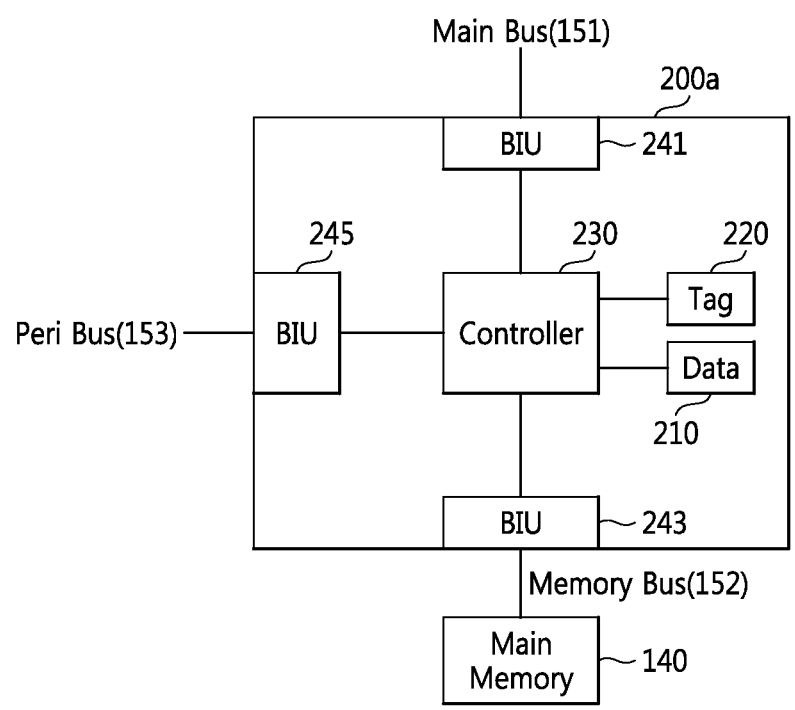
FIG. 2 is a block diagram of a cache memory of FIG. 1 according to an embodiment of the disclosure.
Figure 3:
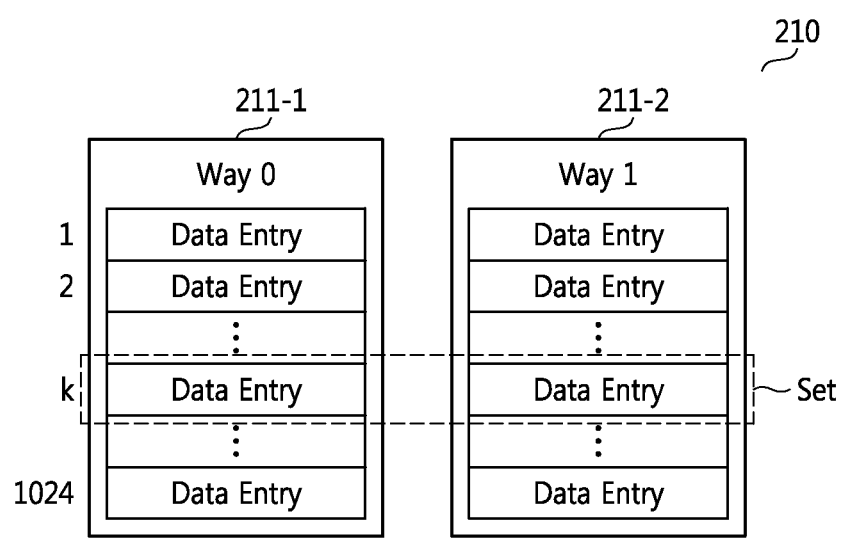
FIG. 3 illustrates a data structure of a data memory of FIG. 2 according to an embodiment of the disclosure.
Figure 4:
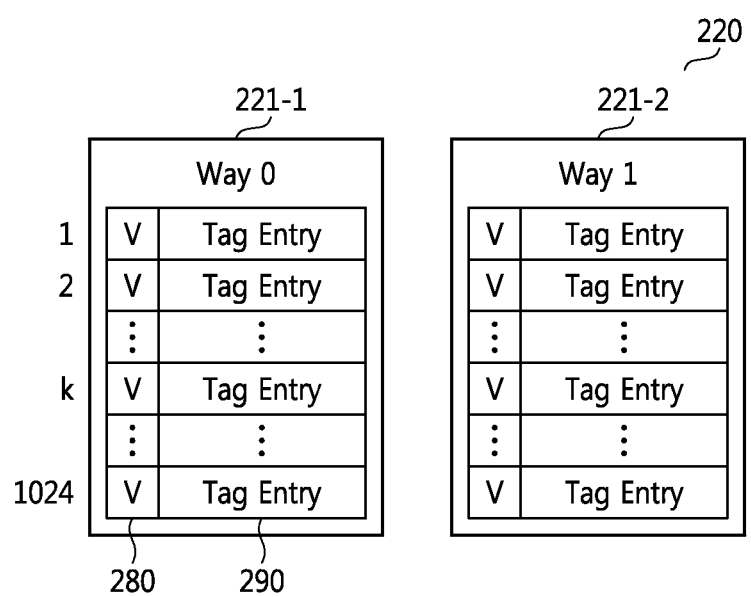
FIG. 4 illustrates a data structure of a tag memory of FIG. 2 according to an embodiment of the disclosure.

FIG. 2 is a block diagram of a cache memory 200a such as that shown in FIG. 1 according to an embodiment of the disclosure. FIG. 3 illustrates a data structure of a data memory 210 of FIG. 2 according to an embodiment of the disclosure. FIG. 4 illustrates a data structure of a tag memory 220 of FIG. 2 according to an embodiment of the disclosure.

Referring to FIGS. 1 to 4, the cache memory 200a according to an embodiment of the disclosure includes a cache controller 230, the data memory 210, and the tag memory 220.

The data memory 210 is a data storage place for storing some of the data stored in the main memory 140, and may include a plurality of data entries (i.e., two or more entries), for example, 1024 data entries.

The tag memory 220 is a storage place for storing information regarding each of the plurality of data entries, e.g., a tag address, valid bits V 280, etc., and may include tag entries, the number of which is equal to the number of the plurality of data entries.

The cache controller 230 may store quality-of-service (QoS) information of each of the first to $m^{th}$ processors 110-1, 110-2, and 110-m, and differently allocate a size of a storage space to be managed by each of the first to $m^{th}$ processors 110-1, 110-2, and 110-m among storage spaces of the data memory 210, based on the QoS information thereof.

For example, the cache controller 230 may limit entries to be managed by a processor (or a transaction) among a plurality of entries or differently set entries to be additionally allocated, based on QoS information of the processor (or the transaction), thereby differently setting the size of a cache to be managed in units of processors (or transactions).

In one exemplary embodiment, the cache controller 230 may set even an entry, which cannot be managed by a processor, to be accessible by the processor in order to maintain cache coherency.

For example, when data is to be read from or written to the data memory 210 through a processor (or a transaction), the cache controller 230 may not limit the reading or writing of the data and may allow data to be read from or written to all entries.

In contrast, when data stored in the data memory 210 is to be deleted (or canceled) or when new entries are to be allocated to a processor (or a transaction), the cache controller 230 may limit entries according to QoS information of the processor.

The cache memory 200 may further include bus interface units BIU 241, 243, and 245 for interfacing with at least one bus.

In one exemplary embodiment, the bus interface units 241, 243, and 245 may include the main bus interface unit 241 for interfacing with a main bus 151, the memory bus interface unit 243 for interfacing with a memory bus 152, and the peripheral bus interface unit 245 for interfacing with a peripheral bus 153.

The cache memory 200 may be embodied as an n-way set-associative cache. In this case, the cache memory 200 may include n sub-memories (which may be also referred to as n ways). Each of the n sub-memories may include a sub data memory and a sub tag memory corresponding thereto. Here, 'n' denotes an integer equal to or greater than '2'.

It is assumed that n=2 and the number of cache lines of each of the n sub-memories is '1024'.

The data memory 210 may include a first sub data memory 211-1 and a second sub data memory 211-2.

In one exemplary embodiment, each of the sub data memories 211-1 and 211-2 may include 1024 cache lines for storing data, and each of the 1024 cache lines may be 64 bytes long. However, exemplary embodiments of the disclosure are not limited thereto.

Each of the 1024 cache lines may be selected by indexes ranging from '1' to '1024'. The cache lines of each of the sub data memories 211-1 and 211-2 selected by the same index (e.g., an arbitrary k ranging from '1' to '1024') may constitute a set of cache lines.

The tag memory 220 may include a first sub tag memory 221-1 and a second sub tag memory 221-2.

Each of the sub tag memories 221-1 and 221-2 may include tag addresses 290, the total number of which is equal to that of the cache lines, e.g., 1024 tag addresses 290.

Each of the sub tag memories 221-1 and 221-2 may further include valid bits V 280 corresponding to the tag addresses 290.

The valid bits V 280 represent whether data of the cache lines corresponding to the tag addresses 290 is valid or not. Each of the sub tag memories 221-1 and 221-2 may further include dirty bits (not shown) representing whether the data of the cache lines is different from the data stored in the main memory 140.

It is hereinafter assumed that a first sub-memory includes the first sub data memory 211-1 and the first sub tag memory 221-1 and a second sub-memory includes the second sub data memory 211-2 and the second sub tag memory 221-2.

Each of the first to $m^{th}$ processors 110-1, 110-2, and 110-m may transmit a request to access a memory, i.e., a transaction trs, to the cache memory 200 via the system bus 150. Each transaction trs may include a specific address.

Figure 5:
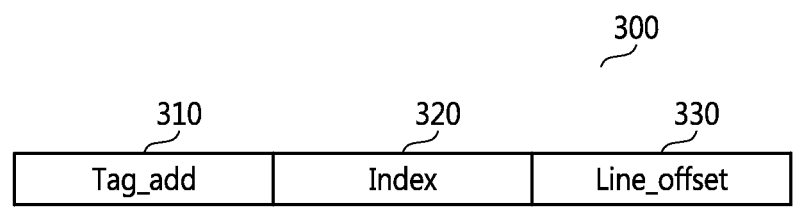
FIG. 5 illustrates a transaction address included in a transaction illustrated in FIG. 1 according to an embodiment of the disclosure.

FIG. 5 illustrates a transaction address included in the transaction trs illustrated in FIG. 1 according to an embodiment of the disclosure.

The transaction address 300 may include a tag address Tag_add 310, an index 320, and a line offset Line_offset 330.

The system bus 150 may access caches of the cache memory 200 by using the tag address Tag_add 310, the index Index 320, and the line offset Line_offset 330.

An operation of accessing a cache will be described with reference to FIGS. 1 and 5 below. Here, it is assumed that n sub tag memories 221-1 to 221-n correspond to the n ways.

The cache controller 230 compares the tag addresses 290 of the sub tag memories 221-1 to 221-n corresponding to the index Index 320 of the transaction address 300 with the tag address Tag_add 310 of the transaction address 300 to determine whether the tag addresses 290 are the same as the tag address Tag_add 310.

When one of the tag addresses 290 is the same as the tag address Tag_add 310 and the valid bits V 280 corresponding to the tag address 290 represent valid, the cache controller 230 may determine that a cache hit occurs. Then, the cache controller 230 may select data corresponding to the line offset Line_offset 330 in a data entry corresponding to the index Index 320 in the sub data memory 211 corresponding to the tag address 290.

Figure 6:
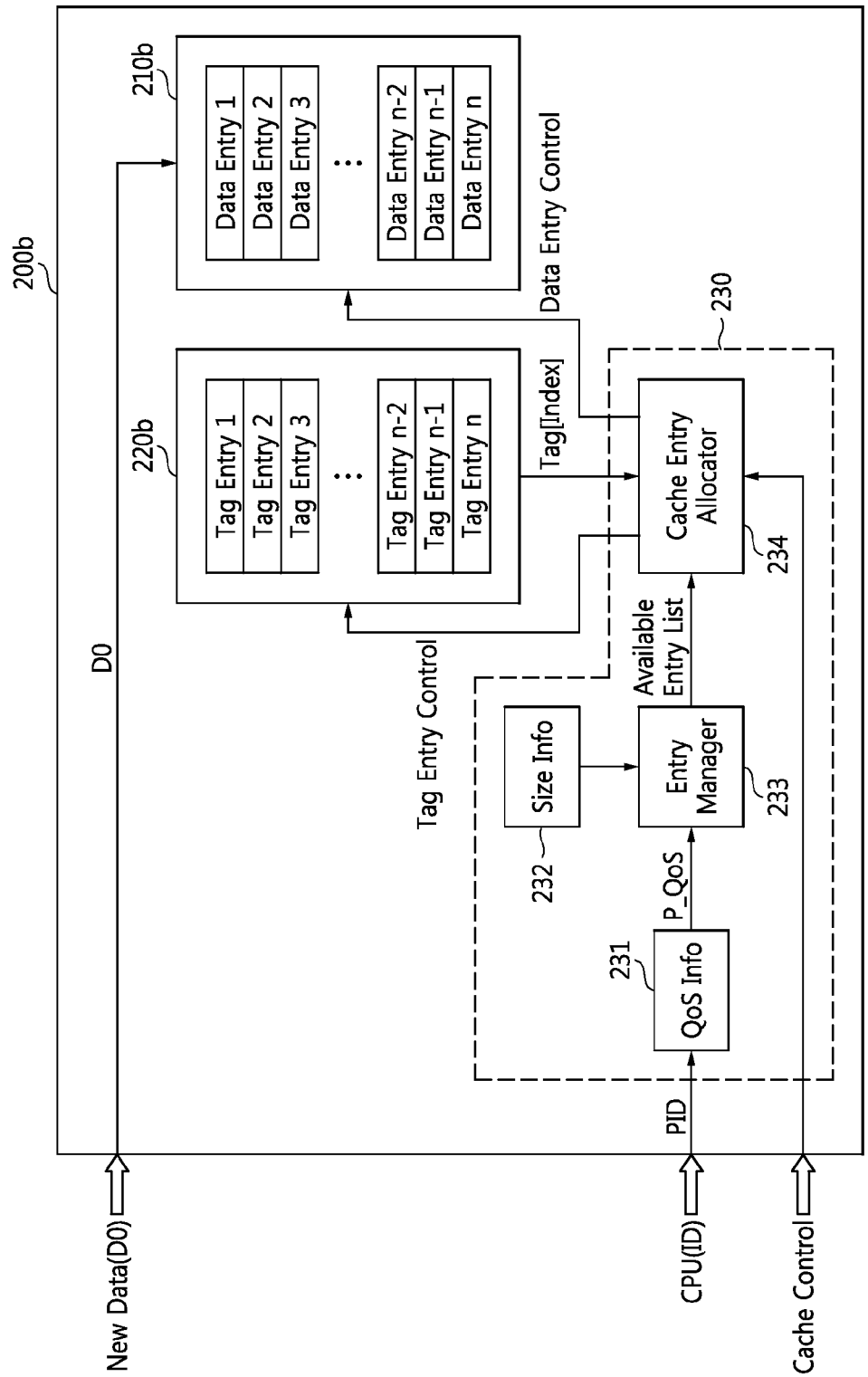
FIG. 6 is a block diagram of a cache memory according to another embodiment of the disclosure.
Figure 7:
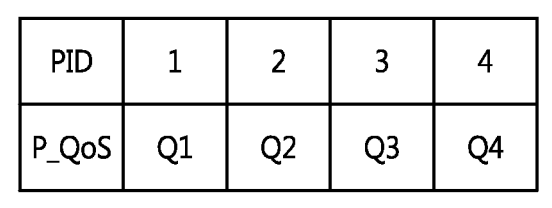

FIG. 6 is a block diagram of a cache memory 200b according to another embodiment of the disclosure. FIG. 7 illustrates a data structure of a QoS information storage unit 231 of FIG. 6 according to an embodiment of the disclosure.

Referring to FIGS. 1, 6, and 7, the cache memory 200b includes a cache controller 230, a data memory 210b, and a tag memory 220b.

The cache controller 230 may include the QoS information storage unit 231, a size information storage unit 232, an entry manager 233, and an entry allocator 234.

The QoS information storage unit 231 stores QoS information P_QoS of each of processors.

For example, as shown in the embodiment of FIG. 7, the QoS information storage unit 231 may store the QoS information P_QoS to correspond to identifiers PID of the respective processors. In the embodiment of FIG. 7, a first value Q1, a second value Q2, a third value Q3, and a fourth value Q4 may be set and stored to correspond to a first processor PID:1, a second processor PID:2, a third processor PID:3, and a fourth processor PID:4, respectively.

The QoS information storage unit 231 may be a special function register (SFR) but is not limited thereto.

The QoS information storage unit 231 may be accessed via a cache management port (not shown). Thus, a user may store the QoS information P_QoS of each of the processors in the QoS information storage unit 231 or change the stored QoS information P_QoS via the cache management port.

According to an exemplary embodiment, the QoS information P_QoS may be set or changed via a separate bus or port. According to another exemplary embodiment, the QoS information P_QoS may be set or changed using software such as an operating system (OS).

When receiving a transaction from a processor, the cache controller 230 also receives the identifier PID of the processor.

The cache controller 230 may extract the QoS information P_QoS corresponding to the received identifier PID of the processor from the QoS information storage unit 231.

The size information storage unit 232 stores information regarding the size of a cache to be allocated, i.e., size information, based on the QoS information P_QoS.

FIG. 8A illustrates a data structure of the size information storage unit 232 of FIG. 6 according to an embodiment of the disclosure.

Referring to FIG. 8A, size information to be allocated based on QoS information P_QoS may be represented using the number of entries that can be allocated. Thus, the size information storage unit 232 may store information regarding the number of entries for each piece of the QoS information P_QoS.

For example, a first number of entries N1, a second number of entries N2, a third number of entries N3, and a fourth number of entries N4 may be set and stored to correspond to a first value Q1, a second value Q2, a third value Q3, and a fourth value Q4, respectively.

If it is assumed that a QoS decreases in the order of the first value Q1, the second value Q2, the third value Q3, and the fourth value Q4, the first number of entries N1 may be greater than the second number of entries N2, the second number of entries N2 may be greater than the third number of entries N3, and the third number of entries N3 may be greater than the fourth number of entries N4.

FIG. 8B illustrates a data structure of the size information storage unit 232 of FIG. 6 according to another embodiment of the disclosure.

Referring to FIG. 8B, size information to be allocated according to QoS information P_QoS may be represented using a group of entries that can be allocated.

In one exemplary embodiment, cache entries (data entries and tag entries) may be divided into a plurality of entry groups, e.g., two or more entry groups.

In the embodiment of FIG. 8B, cache entries may be divided into first to fourth entry groups G1 to G4. All the entry groups G1 to G4 may be allocated to a first value Q1, only the first to third entry groups G1 to G3 may be allocated to a second value Q2, only the first and second entry groups G1 and G2 may be allocated to a third value Q3, and only the first entry group G1 may be allocated to a fourth value Q4.

Cache entries may be divided into a plurality of entry groups according to various criteria.

In one exemplary embodiment, cache entries may be divided into a plurality of groups according to a way.

For example, when the cache memory 200 includes four ways, the first to fourth ways may be divided into the first to fourth entry groups G1 to G4, respectively. For example, although the cache memory 200 includes only two ways in the embodiments of FIGS. 3 and 4, the first ways 211-1 and 221-1 may be set to belong to the first entry group G1 and the second ways 211-2 and 221-2 may be set to belong to the second entry group G2.

In another exemplary embodiment, cache entries may be divided into a plurality of groups according to an index.

For example, when cache entries include 1024 indexes as illustrated in FIGS. 3 and 4, the cache entries may be divided into the first to fourth entry groups G1 to G4 such that each of the entry groups G1 to G4 may include 256-index entries. For example, entries allocated indexes '1' to '256' may be set to belong to the first entry group G1 and entries allocated indexes '257' to '512' may be set to belong to the second entry group G2.

The entry manager 233 may provide the cache entry allocator 234 with an available entry list to be allocated to a target transaction, based on the QoS information P-OoS and the size information.

The cache entry allocator 234 may allocate a new entry to the target transaction or replace the existing entry with another entry, based on the available entry list received from the entry manager 233.

When a new entry needs to be allocated according to a request from a processor, the cache entry allocator 234 may allocate the new entry among limited entries, e.g., entries belonging to the available entry list, based on QoS information P_QoS of the processor.

Also, when entry replacement is needed, the cache entry allocator 234 selects entries to be replaced with other entries according to a replacement policy. The number of entries to be selected may vary according to the QoS information P_QoS.

Thus, the cache entry allocator 234 may differently allocate a size of a storage space to be managed through each processor (or each transaction), e.g., the size of a cache entry (e.g., the number of cache entries), based on the QoS information P_QoS.

Thus, cache entries or an entry group to be managed by each processor (or each transaction) may be limited according to the QoS information P_QoS.

In one exemplary embodiment, a cache way or a cache index to be managed by each processor (each transaction) may be limited according to the QoS information P_QoS.

As described above, according to one exemplary embodiment of the disclosure, a size of caches to be allocated is differently set in a cache memory shared by two or more processors, based on QoS information QoS. Thus, the performance of the cache memory may be changed according to the importance of a processor. That is, more cache entries may be allocated to a processor that needs a high QoS, thereby increasing a cache hit-ratio.

When heterogeneous cores are included in two or more processors, a QoS that a high-performance core (a big core) requires and a QoS that a low-performance core (a little core) requires may be different from each other. Also, a substantial performance, i.e., a QoS, that one processor requires may vary according to a dynamic voltage and frequency scaling (DVFS) situation.

As described above, according to an exemplary embodiment of the disclosure, in an environment in which a required QoS information is variable according to a processor or a situation, a size of caches to be allocated may be differently set according to QoS information so that the performance of a cache memory may be set to be changed according to the importance of a transaction.

Figure 9:
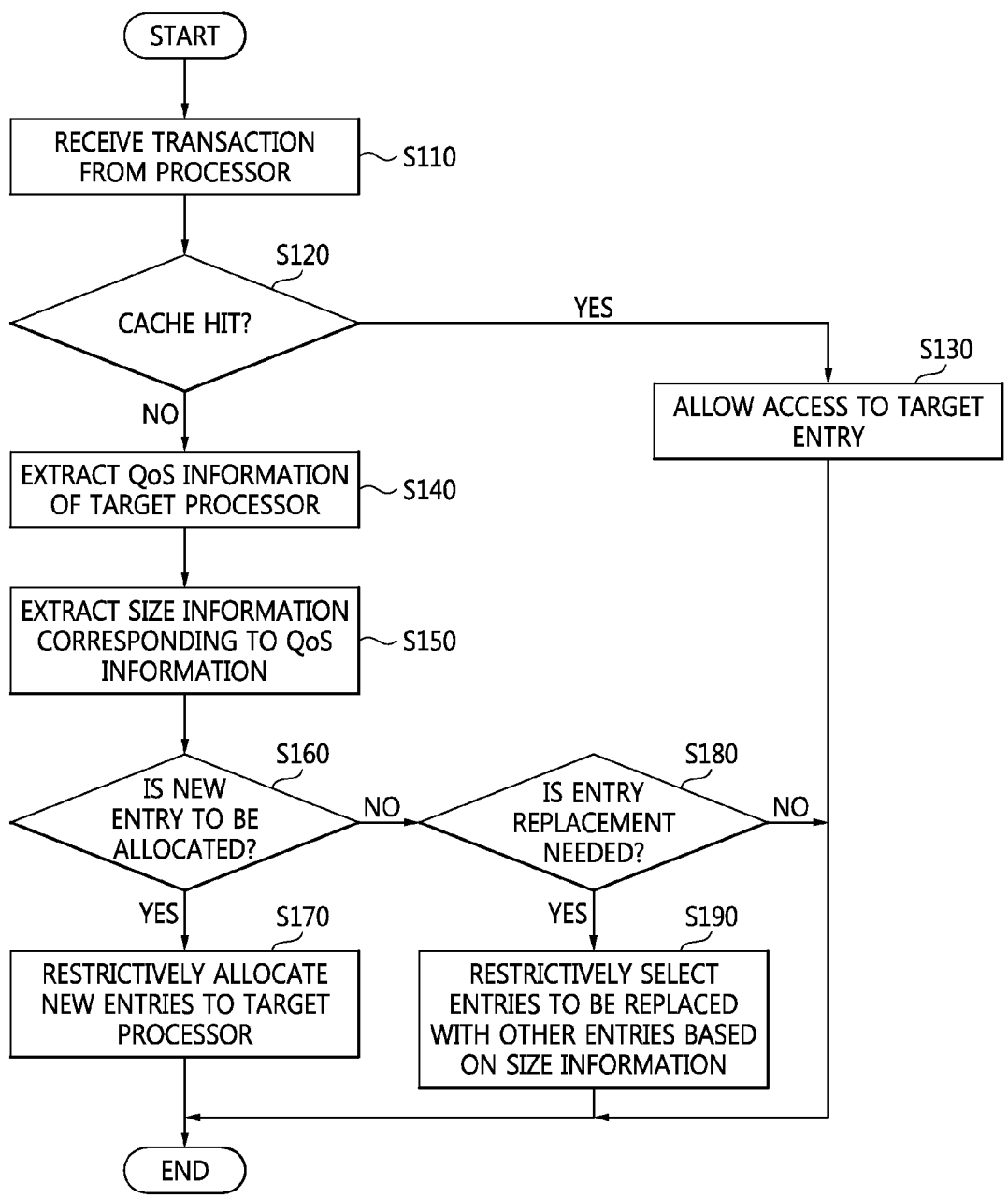
FIG. 9 is a flowchart of a method of operating a cache memory device according to an embodiment of the disclosure.

FIG. 9 is a flowchart of a method of operating a cache memory device according to an embodiment of the disclosure. The method of FIG. 9 may be performed by one of the cache memories 200, 200a, and 200b illustrated in FIGS. 1, 2, and 6.

Referring to FIGS. 1, 2, 6, and 9, when a transaction Trs is received from one of the first to $m^{th}$ processors 110-1, 110-2, and 110-m via the system bus 150 (operation S110), the cache controller 230 may determine whether a cache hit occurs, based on a transaction address included in the transaction trs and a tag address of a tag memory (operation S120). When it is determined in operation S120 that a cache hit occurs, a target entry is allowed to be accessed regardless of QoS information of the processor (operation S130).

When it is determined in operation S120 that a cache hit does not occur, i.e., a cache miss occurs, the cache controller 230 may extract the QoS information of the processor from the QoS information storage unit 231 (operation S140). Also, the cache controller 230 may extract size information corresponding to the QoS information from the size information storage unit 232 (operation S150).

When it is determined in operation S120 that a cache miss occurs, the cache controller 230 determines whether a new entry is to be allocated (operation S160). When it is determined in operation S160 that a new entry is to be allocated, the cache controller 230 restrictively allocates new entries to the target processor based on the size information (operation S170).

For example, even if a large number of new entries can be allocated, the number of new entries or the number of entry groups that are to be allocated may be limited according to the size information of the processor.

When it is determined in operation S160 that a new entry cannot be allocated, the cache controller 230 determines whether existing entries are to be replaced with other entries (operation S180).

According to a result of determining whether the existing entries are to be replaced with other entries, in operation S180, the cache controller 230 may delete or cancel some of data of the existing entries and allocate the deleted or canceled entries to the process (operation S190).

In operation S190, the cache controller 230 may restrictively select entries to be replaced with other entries by limiting the number of entries or groups to be selected based on the size information.

Figure 10:
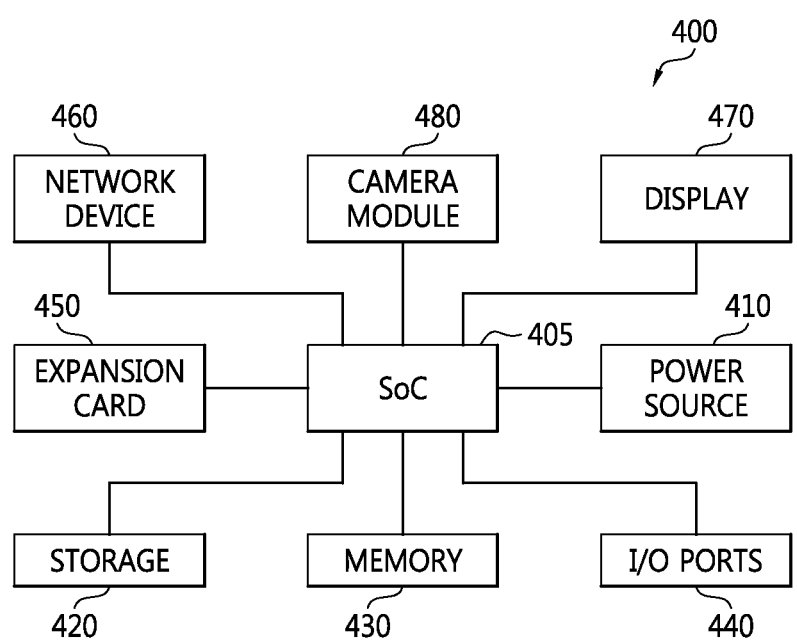
FIG. 10 is a block diagram of an electronic system according to some embodiments of the disclosure.

FIG. 10 is a block diagram of an electronic system 400 according to some embodiments of the disclosure. Referring to FIG. 10, the electronic system 400 may be implemented as a PC, a data server, a laptop computer or a portable device. The portable device may be a cellular phone, a smart phone, a tablet personal computer (PC), a personal digital assistant (PDA), an enterprise digital assistant (EDA), a digital still camera, a digital video camera, a portable multimedia player (PMP), portable navigation device (PDN), a handheld game console, or an e(electronic)-book device.

The electronic system 400 includes the SoC 405, a power source 410, a storage device 420, a memory 430, I/O ports 440, an expansion card 450, a network device 460, and a display 470. The electronic system 400 may further include a camera module 480.

The SoC 405 may control the operation of at least one of the elements 410 through 480.

The power source 410 may supply an operating voltage to at least one of the elements 405, and 420 through 480. The storage device 420 may be implemented by a hard disk drive (HDD) or a solid state drive (SSD).

The memory 430 may be implemented by a volatile or non-volatile memory. A memory controller (not shown) that controls a data access operation, e.g., a read operation, a write operation (or a program operation), or an erase operation, on the memory 430 may be integrated into or embedded in the SoC 405. Alternatively, the memory controller may be provided between the SoC 405 and the memory 430.

The I/O ports 440 are ports that receive data transmitted to the electronic system 400 or transmit data from the electronic system 400 to an external device. For instance, the I/O ports 440 may include a port connecting with a pointing device such as a computer mouse, a port connecting with a printer, and a port connecting with a USB drive.

The expansion card 450 may be implemented as a secure digital (SD) card or a multimedia card (MMC). The expansion card 450 may be a subscriber identity module (SIM) card or a universal SIM (USIM) card.

The network device 460 enables the electronic system 400 to be connected with a wired or wireless network. The display 470 displays data output from the storage device 420, the memory 430, the I/O ports 440, the expansion card 450, or the network device 460.

The camera module 480 converts optical images into electrical images. Accordingly, the electrical images output from the camera module 480 may be stored in the storage module 420, the memory 430, or the expansion card 450. Also, the electrical images output from the camera module 480 may be displayed through the display 470.

According to an exemplary embodiment of the disclosure, the performance of a cache memory shared by two or more processors may be changed according to the importance of each of the two or more processors by differently setting a size of caches to be allocated based on QoS information. Thus, more cache entries may be allocated to a processor that requires a high QoS, thereby increasing a cache hit-ratio.

Also, according to an exemplary embodiment of the disclosure, in an environment in which a QoS varies according to a processor or a situation, the performance of a cache memory may be changed according to the importance of a transaction by differently setting a size of caches to be allocated, based on the QoS information.

While the disclosure has been particularly shown and described with reference to exemplary embodiments thereof, it will be understood that various changes in form and details may be made therein without departing from the spirit and scope of the following claims.

What is claimed is:

1. An electronic system comprising:
a first processor;
a second processor;
a cache memory configured to store some of data stored in a main memory and to be accessible by the first and second processors; and
a cache controller configured to differently set a size of a storage space of the cache memory to be managed by each of the first and second processors, based on quality-of-service (QoS) information of each of the first and second processors, wherein:
the cache memory comprises a plurality of entries,
the plurality of entries is divided into two or more entry groups, and
the cache controller limits an entry group to be accessed among the two or more entry groups, based on cache size information corresponding to the QoS information.

2. The electronic system of claim 1, wherein the cache controller comprises a QoS information storage unit configured to store the QoS information of each of the first and second processors.

3. The electronic system of claim 2, wherein the cache controller further comprises a size information storage unit configured to store the cache size information.

4. The electronic system of claim 3, wherein the cache controller limits entries to be managed by a target processor among the plurality of entries, based on the cache size information.

5. The electronic system of claim 3, wherein:
the cache memory is an n-way set-associative cache including n ways, wherein n denotes an integer equal to or greater than '2', and
the cache controller limits ways to be managed among the n ways, based on the cache size information.

6. The electronic system of claim 3, wherein, when receiving a transaction from the first processor or the second processor, the cache controller receives a processor identifier, extracts QoS information from the QoS information storage unit according to the processor identifier, and extracts cache size information corresponding to the QoS information extracted from the size information storage unit.

7. The electronic system of claim 6, wherein the cache controller further comprises:
an entry manager configured to provide an available entry list based on the extracted cache size information; and
an entry allocator configured to allocate a new entry or replace an existing entry, among the plurality of entries, with another entry according to the available entry list.

8. The electronic system of claim 2, wherein the QoS information is settable through an additional cache management port or software.

9. The electronic system of claim 1, further comprising a bus via which data and a control signal are exchanged among the first processor, the second processor, the cache memory, and the cache controller.

10. The electronic system of claim 1, wherein the cache controller does not limit an access to data stored in the cache memory according to the QoS information of each of the first and second processors when each of the first and second processors accesses the data stored in the cache memory, and limits allocating of a storage space of the cache memory according to the QoS information of the first and second processors when the storage space of the cache memory is newly allocated or replaced with another storage space and allocated with respect to each of the first and second processors.

11. A cache memory device shared by a plurality of processors, the cache memory device comprising:
a cache memory configured to store some of data stored in a main memory and to be accessed by the plurality of processors; and
a cache controller configured to store quality-of-service (QoS) information of each of the plurality of processors, and differently allocate a size of a storage space of the cache memory to be managed by a target processor, based on the QoS information of the target processor, wherein
a number of the plurality of processors is equal to or greater than '2', wherein:
the cache memory comprises a plurality of entries, and
the cache controller further comprises:
an entry manager configured to provide an available entry list based on cache size information corresponding to the QoS information, and
an entry allocator configured to allocate a new entry or replace an existing entry, among the plurality of entries, with another entry according to the available entry list.

12. The cache memory device of claim 11, wherein the cache controller comprises a QoS information storage unit configured to store the QoS information of each of the plurality of processors, and receives a processor identifier of one of the plurality of processors when a transaction is received from the processor and extracts the QoS information corresponding to the processor identifier from the QoS information storage unit.

13. The cache memory device of claim 12, wherein the cache controller further comprises a size information storage unit configured to store the cache size information.

14. The cache memory device of claim 13, wherein the cache controller limits entries to be managed among the plurality of entries according to the cache size information.

15. The cache memory device of claim 13, wherein:
the plurality of entries is divided into two or more entry groups, and the cache controller limits an entry group to be managed among the two or more entry groups according to the cache size information.

16. The cache memory device of claim 11, wherein the cache controller does not limit an access to data stored in the cache memory according to the QoS information of each of first and second processors, among the plurality of processors, when each of the first and second processors accesses the data stored in the cache memory, and limits allocating of the storage space of the cache memory according to the QoS information of the first and second processors when the storage space of the cache memory is newly allocated or replaced with another storage space and allocated with respect to each of the first and second processors.

17. A method, executed by a cache memory controller, of allocating memory of a cache, shared in common by multiple processors, to each of the processors, the method comprising:

receiving, from each of the processors, an electronic communication comprising an indication of the processor's identification;

identifying, for each processor based upon the indication of the processor's identification, quality-of-service (QoS) information identifying a QoS required by the processor;

allocating memory of the cache to each of the processors in accordance with the identified QoS information for the processor;

receiving a data request from a first of the processors;

determining whether the requested data is stored in the memory allocated to the first processor;

determining whether the memory allocated to the first processor should be expanded, upon determining that the requested data is not stored in the memory allocated to the first processor; and allocating additional memory to the first processor, upon determining that the memory allocated to the first processor should be expanded.

18. The method of claim 17, further comprising:

determining whether a data entry stored in the memory of the cache allocated to the first processor should be replaced with the data requested by the first processor, upon determining that the memory allocated to the first processor should not be expanded; and replacing the data entry with the data requested by the first processor, upon determining that the data entry stored in the memory of the cache allocated to the first processor should be replaced with the data requested by the first processor.

19. The method of claim 17, wherein allocating the memory of the cache to each of the processors comprises:

identifying cache size information corresponding to the QoS information for the processor, and allocating the memory of the cache to the processors in accordance with the identified cache size information.

* * * * *